United States Patent [19]
Wack et al.

[11] 3,884,762
[45] May 20, 1975

[54] FERMENTATION PROCESS FOR THE PREPARATION OF ERGOT ALKALOIDS

[75] Inventors: Géza Wack; Lajós Nagy; Dénes Székély; József Szolnoky; Eva Udvardy-Nagy; Erzsébet Zsóka, all of Budapest, Hungary

[73] Assignee: Richger Gedeon Vegyeszeti Gyar RT, Budapest, Hungary

[22] Filed: June 27, 1973

[21] Appl. No.: 374,105

[30] Foreign Application Priority Data
July 21, 1972 Hungary .......................... OE 11471

[52] U.S. Cl. ....................... 195/81; 195/32; 195/35
[51] Int. Cl. ............................................. C12d 13/00
[58] Field of Search.......................... 195/81, 32, 35

[56] References Cited
OTHER PUBLICATIONS
Chem. Abstracts 72: 118589p (1970).
Chem. Abstracts 68: 57609p (1968).
Amici et al, "Applied Microbiology, " Vol. 18, pp. 464–8 (Sept., 1969).

*Primary Examiner*—A. Louis Monacell
*Assistant Examiner*—Thomas G. Wiseman
*Attorney, Agent, or Firm*—Karl F. Ross; Herbert Dubno

[57] ABSTRACT

The invention relates to a fermentation process for the preparation of ergot alkaloids, mainly ergocryptine and ergocornine, by cultivating a Claviceps purpurea strain on a liquid, aerated culture broth containing saccharose, an inorganic nitrogen source and other known additives, in which a Claviceps purpurea variant strain deposited with the National Institute of Public Health (Orszagos Kozegeszsegugyi Intezet), Budapest, Hungary, under No. 88/1972 is used as Claviceps strain.

Using the new Claviceps purpurea variant strain in the fermentation process the alkaloids can be produced in a well reproducible and highly economic process.

2 Claims, No Drawings

FERMENTATION PROCESS FOR THE PREPARATION OF ERGOT ALKALOIDS

This invention relates to a fermentation process for the preparation of ergot alkaloids. The process of the invention is usable first of all for the preparation of ergocryptine and ergocornine.

After experiments of theoretical value for the production of saprophytic alkaloids, the fermentation process for the preparation of lysergic amide, constituting the basic skeleton of the classical ergot alkaloids, was the first one which could be realized in industrial scale (British Patent Specifications Nos. 883,229 and 1,041,246). The elaboration of these processes was significantly enhanced by two facts: *Claviceps paspali*, a lysergic acid producing microorganism originating from a grass species, possesses particularly advantageous cultivation properties in comparison with the Claviceps species originating from rye, and on the other hand, the thus-formed lysergic amide is water-soluble, and accordingly, when excreted by the microorganism cells, it can accumulate in the liquid part of the fermentation broth.

The first fermentation process producing a valuable alkaloid, the water-soluble ergometrine (see British Patent Specification No. 1,071,846) was elaborated on the basis of the observations obtained in connection with the lysergic amide producing processes. The microorganism strain used in this process was a new representative of the genus *Claviceps paspali* mentioned above. Soon thereafter a commercial-scale fermentation process producing proper alkaloid levels has been elaborated for the production of ergometrine, in which the rye-parasitic *Claviceps purpurea*, a characteristic strain of the open-air rye cultivation, was utilized (British Patent Specification No. 1,170,600).

Despite the large number of literature data all the fermentation processes for the production of ergot alkaloids utilizing *Claviceps purpurea* and producing hardly water-soluble peptide-type alkaloids (such as the members of the ergotoxine group, or ergotamine) show several uncertainities in their reproducibility. The cyclic side-chain of the peptide-type alkaloids consisting of three amino acids renders the biosynthetic process more complicated. Moreover, several difficulties arise from the fact that the hardly water-soluble alkaloids accumulate in the cells. This feature is disadvantageous both as regards the alkaloid formation and with respect to the separation of the alkaloid from the culture broth.

The biosynthesis of peptide-type alkaloids is favourably influenced by ensuring the presence of a proper nitrogen source in the whole fermentation process. According to the earlier procedures appropriate amino acids, such as asparagine (German Patent Specification No. 1,007,949), or complex nitrogen sources of natural origin, such as yeast extract, peptone, vegetable extracts, etc. (see German Patent Specification No. 1,120,128) were added to the culture broth usually in an amount of 1%.

The use of these substances, however, involves the disadvantage that they accelerate the growth of the respective microorganisms, too. Rapidly growing cultures, however, produce no or only little amounts of such metabolism products as the ergot alkaloids. As it is known, ergot alkaloids are produced during the so-called secondary metabolism, i.e. when the microorganism growth is retarded.

When separating the peptide-type alkaloids accumulated in the microorganism cells a part of the lipid and pigment content of the cells also enters into the extract. Due to the fact that these components have solubility and distribution conditions similar to those of the ergot alkaloids, their removal from the products is extraordinarily difficult. No directives can be found in the previous publications for reducing the pigment production during the fermentation, even more, according to some references the retarded growth necessary for the secondary metabolism is attained by adjusting the phosphorous content of the culture broth to a low value (0.25 g. of potassium dihydrophosphate pro litre). As it is known, these low amounts of phosphorous are consumed and the growth rate is decreased within some days, due to the lack of phosphorous, however, a strong pigment formation sets in.(See British Patent Specification No. 1,064,764.)

In order to avoid the disadvantages mentioned above, our work aimed at the isolation of a Claviceps purpurea strain capable of producing a peptide-type alkaloid by cultivation, well utilizing the inorganic nitrogen sources, producing alkaloid also on media of elevated phosphorous content, and producing the alkaloid relatively quickly (i.e. the alkaloid level of the culture tends to reach the maximum on the 6th to 7th day of cultivation).

Such strains are isolated as follows:

*Claviceps purpurea* strain is cultivated from a sclerotium of high alkaloid content, and the aimed variant is gradually enriched from this culture using three inoculation steps in repetitive cycles. In the individual transinoculation cycles an inoculum is produced on a liquid culture medium using the colonies removed from a solid culture medium, thereafter, using this inoculum, a liquid alkaloid-producing culture is prepared. Finally, the cells produced in this latter stage are transinoculated again onto a solid culture medium.

Ammonium nitrate is added to each of the individual culture media in increasing amounts of 1.0 to 10.0 g./l. corresponding to the decreasing sensibility of the microorganism. To the liquid culture medium of the alkaloid producing cultivation there are also added 0.5 g./l. of potassium dihydrophosphate together with 20.0 g./l. of sodium chloride (this latter substance has already been used in earlier processes, see for example British Patent Specification No. 1,170,600).

The sharp-edged, conically emerging colonies showing no conidium formation are removed from the solid culture medium. Among the alkaloid-producing liquid cultures those are transinoculated to the solid culture media which produce the highest alkaloid level on the 6th to 7th day of cultivation, and show the most favorable ratios of peptide-type alkaloids. Using elevated amounts of phosphorous, the growth retardation necessary for the alkaloid production is ensured by the sodium chloride additive.

Using the procedure as outlined above a new strain is isolated. This strain is a variant of *Claviceps purpurea* capable of producing ergocryptine and ergocornine, and possessing the required favourable properties.

The thus-obtained strain was deposited with the National Institute for Public Health (Orszagos Korzegeszsegugyi Intezet), Budapest, Hungary, under No. 88/1972.

For the proper identification of the new strain, the following morphological and biochemical characteristics are given:

Morphology of colonies formed on SC 101 nutrient medium after an incubation period of 30 days:

Sharp-edged, emerging, radially wrinkled colonies of 25 to 30 mm. diameter. Velvet-like, white surface with a light beige center and brownish reverse side. The solid colonies cannot be removed easily from the agar surface. No conidium formation can be observed. In microscopic examination the colony-forming cells are mainly swollen, short, and strongly granular.

Culture medium SC 101 has the following composition:

| | |
|---|---|
| saccharose | 100.0 g. |
| citric acid | 10.0 g. |
| sodium chloride | 10.0 g. |
| ammonium nitrate | 1.0 g. |
| potassium dihydrophosphate | 0.3 g. |
| magnesium sulfate | ad pH 5.2 |
| ammonium hydroxide | |
| fibrous agar | 20.0 g. |
| water | ad 1000 ml. |

Morphology of liquid culture after 6 days of incubation on SB 203 culture medium:

Light beige colored, fluffy growth. In microscopic examination the cells of the culture form highly refractive, septated, straight hyphi with a few branches of 4 to 5 μ thickness. The older cells are swollen and granular.

Culture medium SB 203 has the following composition:

| | |
|---|---|
| saccharose | 100.0 g. |
| succinic acid | 10.0 g. |
| sodium chloride | 20.0 g. |
| ammonium nitrate | 3.0 g. |
| potassium dihydrophosphate | 0.5 g. |
| magnesium sulfate | 0.25 g. |
| ammonium hydroxide | ad pH 5.2 |
| water | ad 1000 ml. |

Growth and alkaloid production of the strain on SB 203 culture medium:

| Day of cultivation | dry micelium /100 ml. | alkaloid content γ/ml. | specific alkaloid content mg./g. |
|---|---|---|---|
| 0 | 0.3 | 0 | 0 |
| 1 | 0.7 | 60 | 8.6 |
| 2 | 1.22 | 105 | 8.6 |
| 3 | 1.68 | 220 | 13.0 |
| 4 | 2.18 | 448 | 20.6 |
| 5 | 2.65 | 834 | 31.5 |
| 6 | 2.82 | 858 | 30.4 |

Effect of organic nitrogen sources on the alkaloid production of the strain:

| Nitrogen source | Concentration g./l. | Alkaloid content on the 7th day, γ/ml. |
|---|---|---|
| asparagin | 3.0 | 945 |
| pepton | 3.0 | 402 |
| casein | 3.0 | 730 |
| corn steep liquor | 3.0 | 595 |
| ammonium nitrate (control) | 3.0 | 1042 |

Effect of ammonium nitrate on the alkaloid production of the strain:

| Ammonium nitrate g./l. | Alkaloid content on the 7th day, γ /ml. | Relative amount of peptide-type alkaloids on the 7th day, % |
|---|---|---|
| 0 | 1072 | 52 |
| 2.0 | 1482 | 66 |
| 3.0 | 1530 | 71 |
| 6.0 | 1121 | 69 |
| 10.0 | 1036 | 61 |
| 15.0 | 981 | 64 |

In order to isolate and identify the alkaloids the culture broth was extracted with a 4:1 mixture of chloroform and isopropanol, and the extract containing the alkaloids was subjected to chromatography on alumina layer. The individual components were eluted, and their concentrations were determined on the basis of UV absorption, using identical reference standards in each of the examinations.

The characteristic distribution of the alkaloids produced by the strain is as follows:

| | |
|---|---|
| ergocryptinine | 5 % |
| ergocorninine | 4 % |
| ergocryptine | 30 % |
| ergocornine | 28 % |
| ergosine | 5 % |
| ergometrinine | 4 % |
| ergometrine | 22 % |
| other water-soluble alkaloids | 4 % |

On the basis of the above, the characteristics of the *Claviceps purpurea* OKI 88/1972 strain can be summarized as follows:

A variant prepared without mutagen treatment, capable of producing alkaloids under saprophytic conditions. 0.1 to 1.0% amounts of ammonium nitrate in the culture medium do not retard, but exert a favorable influence on the growth and alkaloid production of the strain. Dark violet pigment formation, characteristic of the Claviceps strains, cannot be observed in the alkaloid-productng culture broths. The alkaloid production reaches the maximum on the 6th to 7th day of cultivation. On the 7th day of cultivation the quantity of mycelia is below 3.5%, accordingly the relative alkaloid production — calculated for dry cells — amounts to 30 mg./g. 60 to 70% of the thus-produced alkaloids consist of two components of the ergotoxine groups and their isomers, respectively, in practically identical ratios.

Accordingly, this invention relates to a fermentation process for the preparation of ergot alkaloids, mainly ergocryptine and ergocornine, by cultivating a Claviceps purpurea strain on a liquid, aerated culture broth containing saccharose, an inorganic nitrogen source and other known additives, in which a new Claviceps purpurea variant strain deposited with the National Institute of Public Health (Orszagos Kozegeszsegugyi Intezet), Budapest, Hungary, under No. 88/1972 is used as microorganism.

This strain, due to its favorable properties, can be used with great advantages for the preparation of ergocryptine and ergocornine. The fermentation process can be carried out on known culture media by methods known in the art, and has several advantages over the hitherto known fermentation process for the preparation of ergotoxine alkaloids. The main advantages are summarized below:

1. The stability of the strain obtained without mutagenic treatment is higher than that of the mutant strains, accordingly the process utilizing this new strain is well reproducible.
2. By excluding the organic nitrogen sources from the culture medium and substituting them by ammonium nitrate, the reproducibility can further be increased and the economy of the process becomes more favorable.
3. The fermentation process requires 5 to 7 days; while using the known processes 8 to 12 days were required for the production of peptide-type alkaloids in appreciable amounts.
4. Due to the decreased pigment production and the low amount of mycelia, the alkaloids can be removed more easily from the culture broth.
5. The ratios of the alkaloids produced in the culture broth are very favorable. The alkaloids belonging to the ergotoxine group are formed in equal amounts, and when separating these two alkaloids and supplementing the obtained mixture with ergocrystine, a complete ergotoxine composition of the usual component ratios can be obtained.
6. The most important accompanying alkaloid, the water soluble ergometrine, can easily be removed during the working-up procedure, and can be isolated separately.

The invention is further illustrated by the aid of the following non-limiting Examples.

EXAMPLE 1

A typical 30 days old colony of the Claviceps strain OKI No. 88/1972 is removed from the surface of SC 101 solid culture medium, and homogenized in 10 ml. of sterile water. 100 ml. of an S2C culture medium, filled into an 500 ml. Erlenmeyer flask, is inoculated with this suspension. The S2C culture medium has the following composition.

| | |
|---|---|
| saccharose | 200.0 g. |
| citric acid | 15.0 g. |
| potassium dihydrophosphate | 0.5 g. |
| magnesium sulfate | 0.3 g. |
| ammonium hydroxide | ad pH 5.2 |
| water | ad 1000.0 ml. |

The culture is shaken at 24°C for 6 days, thereafter a 10 ml. fraction is removed, and this fraction is used for the inoculation of 100 ml. of an SB 101 culture medium, filled into a 500 ml. Erlenmeyer flask. The SB 101 culture medium has the following composition:

| | |
|---|---|
| saccharose | 100.0 g. |
| succinic acid | 10.0 g. |
| calcium nitrate | 1.0 g. |
| ammonium nitrate | 1.0 g. |
| potassium dihydrophosphate | 0.5 g. |
| magnesium sulfate | 0.3 g. |
| sodium chloride | 10.0 g. |
| ammonium hydroxide | ad pH 5.2 |
| water | ad 1000.0 g. |

The culture is shaken at 24°C for 7 days. The dry material content of the culture is 3.42%.

100 ml. of the culture obtained as described above is extracted with 50 ml. of a 4:1 mixture of chloroform and isopropanol. 10 ml. of the extract is evaporated, the residue is taken up in 1 ml. of a 1:1 mixture of chloroform and methanol, and the solution is subjected to chromatography on a dry alumina layer. The alkaloid spots are traced in UV light, eluted with 50% aqueous methanol containing 1% of tartaric acid, and the amounts of the respective alkaloids are determined on the basis of UV absorption.

The total alkaloid content of the culture is 1687 $\gamma$/ml., while the ergocornine-ergocryptine content amount to 1187 $\gamma$/ml.

Ergocryptine and ergocornine can be isolated in crystalline form from any of the cultures by known techniques.

EXAMPLE 2

The strain and the solid agar culture medium are the same as described in Example 1.

A coherent mycelium layer of about 150 cm$^2$, surface of a 30 days old culture is crapped from the surface of the solid agar culture medium. The substance is suspended and homogenized in 100 ml. of water.

20 ml. fractions each of the thus-obtained suspension are used for the inoculation of two 750 ml. Erlenmeyer flasks, each containing 200 ml. of SC 100 culture medium. The composition of the SC 100 culture medium is the following:

| | |
|---|---|
| saccharose | 100.0 g. |
| citric acid | 10.0 g. |
| magnesium sulfate | 0.3 g. |
| potassium dihydrophosphate | 0.5 g. |
| sodium chloride | 10.0 g. |
| ammonium hydroxide | ad pH 5.2 |
| water | ad 1000.0 ml. |

The mixture is shaken at 24°C for 6 days, thereafter the 400 ml. of the thus-obtained inoculum is used for the inoculation of 6 l. of an SB 103 culture broth filled into a 10 l. laboratory fermenter. The composition of the SB 103 culture medium is the following:

| | |
|---|---|
| saccharose | 100.0 g. |
| succinic acid | 10.0 g. |
| sodium chloride | 10.0 g. |
| ammonium nitrate | 3.0 g. |
| calcium nitrate | 1.0 g. |
| potassium dihydrophosphate | 0.5 g. |
| magnesium sulfate | 0.3 g. |
| ammonium hydroxide | ad pH 5.6 |
| water | ad 1000.0 ml. |

This culture broth is stirred at 25°C with 240 r.p.m. and aerated with a velocity of 0.5 l. of air/l.min. Fermentation is continued for 5 days. The dry material content of the thus-obtained culture broth is 3.14%, the total alkaloid content (determined as described in Example 1) is 1046 $\gamma$/ml. The ergometrine content amounts to 310 $\gamma$/ml., while the ergocornine-ergocryptine content is 636 $\gamma$/ml.

The culture broth is worked up as described in Example 1.

EXAMPLE 3

Using the strain identified in Example 1, a mycelium layer is produced on an SB 010 solid culture medium by incubating for 30 days. The composition of the SB 010 culture medium is the following:

| | |
|---|---|
| saccharose | 100.0 g. |
| succinic acid | 10.0 g. |
| ammonium nitrate | 10.0 g. |

-Continued

| | |
|---|---|
| calcium nitrate | 1.0 g. |
| potassium dihydrophosphate | 0.25 g. |
| magnesium sulfate | 0.25 g. |
| ammonium hydroxide | ad pH 5.2 |
| fibrous agar | 25.0 g. |
| water | ad 1000.0 ml. |

The culture is separated from the agar surface, and is used for the preparation of an inoculum as described in Example 2, utilizing a SC 100 culture medium. On the 6th day of cultivation 6 liters each of a sterile SB 101 culture medium filled into 10 l. fermenters are inoculated with 400 ml. portions of the obtained inoculum, and the cultivation is continued for 5 days as described in Example 2. At this stage the obtained culture broths are combined, and this inoculum (18 liters) is used for the inoculation of 200 l. of SC 101 liquid culture medium filled into a 300 l. pilot plant scale fermenter. This medium contains no fibrous agar, otherwise it is of the same composition as indicated above. The culture broth is stirred with 300 r.p.m. and aerated with a velocity of 9 m$^3$. air per hour. Fermentation is continued for 6 days at 25°C. From the 55 to 60th hour of fermentation the pH of the culture is maintained at 4.5 by adding ammonium hydroxide.

At the 6th day of cultivation the dry material content of the broth is 3.42%, the total alkaloid content is 1246 $\gamma$/ml., while the ergocornine - ergocryptine content amounts to 646 $\gamma$/ml. The ergometrine content is 202 $\gamma$/ml.

The broth is worked up as described in Example 1.

What we claim is:

1. A fermentation process for the preparation of ergot alkaloids, mainly ergocryptine and ergocornine, by cultivating a *Claviceps purpurea* strain on a liquid, aerated culture broth containing saccharose and an inorganic nitrogen source, in which a *Claviceps purpurea* variant strain deposited with the National Institute of Public Health (Orszagos Kozegeszsegugyi Intezet), Budapest, Hungary, under No. 88/1972 is used as Claviceps strain.

2. The process defined in claim 1 wherein said inorganic nitrogen source is ammonium nitrate.

* * * * *